US005182160A

United States Patent [19]

Kitamura et al.

[11] Patent Number: 5,182,160

[45] Date of Patent: Jan. 26, 1993

[54] THERMAL-TRANSFER RECORDING MEDIUM

[75] Inventors: Shigehiro Kitamura; Hiroshi Watanabe; Takao Abe, all of Hino, Japan

[73] Assignee: Konica Corporation, Tokyo, Japan

[21] Appl. No.: 777,062

[22] Filed: Oct. 16, 1991

[30] Foreign Application Priority Data

Oct. 19, 1990 [JP] Japan .................................. 2-282300

[51] Int. Cl.[5] .................................................. B32B 3/00

[52] U.S. Cl. .................................... 428/195; 428/484; 428/488.1; 428/913; 428/914

[58] Field of Search ..................... 428/195, 484, 488.1, 428/488.4, 913, 914

[56] References Cited

U.S. PATENT DOCUMENTS 4,965,132 10/1990 Mizobuchi et al. .............. 428/411.1

*Primary Examiner*—Patrick J. Ryan
*Assistant Examiner*—Elizabeth Evans
*Attorney, Agent, or Firm*—Jordan B. Bierman

[57] ABSTRACT

A thermal-transfer recording medium having thereon a peeling layer, a heat-meltable ink layer is disclosed. The peeling layer comprises principally a microcrystaline wax whose penetration number at 25° C. is not more than 20. It is suitable for high speed printing of an excellent resolution with low transfer energy.

11 Claims, No Drawings

THERMAL-TRANSFER RECORDING MEDIUM

FIELD OF THE INVENTION

The present invention relates to a thermal-transfer recording medium, and more particularly to a thermal-transfer recording medium capable of transferring a high-quality image with an excellent resolution even onto a transfer image-receiving medium having a poor surface smoothness, and also of realizing a high-quality image printing with low printing energy even in a high-speed printing operation.

BACKGROUND OF THE INVENTION

With the recent popularization of word processors provided with thermal-transfer devices, a thermal-transfer recording medium comprising a support having thereon a heat-meltable ink layer has now been used extensively.

However, in the conventional thermal-transfer recording medium, its printing quality is liable to be affected by the surface smoothness of a transfer image-receiving medium such as a copying paper, and when used for printing in a high-speed thermal-transfer recording device, it lacks transfer sensitivity to invite deterioration of the print quality, particularly of resolution.

In order to improve the transfer sensitivity, various attempts have been made to have the heat-meltable layer of the thermal-transfer recording medium made in the form of a multilayer composition or provided with a specific peeling layer.

Conventionally known as the peeling layer is one composed principally of a wax such as paraffin.

However, the peeling layer comprised principally of such a conventional wax has an insufficient peeling characteristic. If a low-melting paraffin is used in trying to increase the peeling characteristic, its low-molecular paraffin moiety moves to the ink layer, resulting in the deterioration of its image-printing quality.

To avoid this, the use of a high-melting paraffin or of polyethylene wax is disclosed in JP O.P.I. Nos. 68786/1987 and 87391/1987. The disclosed technique, however, has the problem that in a high-speed printing, the peeling characteristic becomes insufficient and no sufficient transfer sensitivity is obtained.

The present invention has been made on the basis of the above-mentioned situation.

SUMMARY OF THE INVENTION

It is an object of the invention to provide a thermal-transfer recording medium which, in a high-speed printing operation, is capable of transferring a high-quality image having an excellent resolution with sufficiently low transfer energy even onto a poor surface smoothness-having transfer medium.

The above object of the invention is accomplished by a thermal-transfer recording medium comprising a support having thereon at least a peeling layer and a heat-meltable ink layer, the peeling layer being comprised principally of a microcrystaline wax whose penetration number at 25° C. is not more than 20.

The thermal-transfer recording medium of the invention comprises a support having thereon at least the aforementioned peeling layer and heat-meltable ink layer in the described order. The thermal-transfer recording medium may have other layers as long as they do not impair the characteristics of the medium; for example, an intermediate layer may be provided between the heat-meltable ink layer and the peeling layer, and a protective layer as the outermost layer also may be provided on the heat-meltable ink layer. Further, the peeling layer and heat-meltable ink layer each may, if necessary, be of a multilayer construction.

DETAILED DESCRIPTION OF THE INVENTION

The constitution of the thermal-transfer recording medium of the invention will be described in the order of the support, peeling layer and heat-meltable ink layer.

Support

The support preferably has a good heat resistance and an excellent dimensional stability.

Materials usable as the support include papers such as ordinary paper, condenser paper, laminated paper and coated paper; films of resins such as polyethylene, polyethylene terephthalate, polystyrene, polypropylene and polyimide; paper/resin film complex; and sheets of metal such as aluminum foil.

Thickness of the support is normally not more than 30 μm, and preferably 2 to 30 μm. If the thickness exceeds 30 μm, the thermal conductivity of the support is deteriorated to sometimes lower the print quality.

In the thermal-transfer recording medium of the invention, the back of the support may be of an arbitrary composition comprising e.g., a backing layer such as an antisticking layer may be provided.

Normally, on the support is formed a peeling layer which is described below:

Peeling layer

In the thermal-transfer recording medium of the invention, it is important for the peeling layer to contain principally a microcrystaline wax having a penetration number at 25° C. of not more than 20. Even if the peeling layer contains a microcrystaline wax as its principal constituent, if the penetration number at 25° C. exceeds 20, the peeling layer is unable to show its peeling ability adequately, thus making it difficult to accomplish the object of the invention.

The microcrystaline wax having a penetration number at 25° C. of not more than 20, which is used as the principal constituent of the peeling layer of the thermal-transfer recording medium of the invention, is hereinafter sometimes called Microcrystaline wax (I) in distinction from other microcrystaline waxes.

The melting point of Microcrystaline wax (I), obtained by measuring with use of Yanagimoto MJP-2, is preferably 50° to 120° C., and more preferably 60° to 100° C.

If the melting point is too low, a low-melting moiety of Microcrystaline wax (I) moves into the heat-meltable ink layer to result in deterioration of the print quality, while if the melting point is too high, it causes the peeling layer's peeling ability to be insufficient.

As the above Microcrystaline wax (I) there may be used those commercially available or others, which include Hi-Mic-2095, Hi-Mic-1080 and Hi-Mic-2069, produced by Nippon Seiro Co.; Nisseki Microwax 155 and Nisseki Microwax 180, produced by Nippon Oil Co., Ltd.; and MEKON WHITE, FORTEX, PETROLITE C-1035, PETROLITE C-700, BE SQUARE 195, BE SQUARE 185, STARWAX 100 and BE SQUARE 175, produced by Toyo Petrolite Co. Those useful as the Microcrystaline wax (I) of the invention, however, are not limited to the above exemplified ones.

These waxes as Microcrystaline wax (I) may be used alone or in combination.

In the thermal-transfer recording medium of the invention, the peeling layer may be comprised of the Microcrystaline wax (I) alone, but preferably comprised of the same together with a known appropriate binder such as a thermoplastic resin or cellulose resin.

Useful examples of the constituent combination for the peeling layer include the Microcrystaline wax (I) as a principal constituent in combination with a thermoplastic resin, with a cellulose resin, and with a thermoplastic resin and cellulose resin.

Preferred among the above examples is the combination of Microcrystaline wax (I) with at least one additional cellulose resin.

The peeling layer may, if necessary, contain additional constituents such as a heat-meltable substance, a coloring agent and a filler besides Micrycrystaline wax (I).

As has been mentioned, the peeling layer of the invention is allowed to contain additional appropriate constituents besides Microcrystaline wax (I), but it is of vital importance that Microcrystaline wax (I) is the principal constituent of the peeling layer; to be concrete, Microrystaline wax (I) accounts for more than 50% by weight, and preferably 60 to 95% by weight of the whole composition of the peeling layer.

Thus, the Microcrystaline wax (I)-dominant peeling layer is created to thereby accomplish the object of the invention.

If the Microcrystaline wax (I) content of the peeling layer is too small, it causes the peeling layer's characteristics to be insufficient, making it impossible to accomplish the object of the invention.

As the foregoing thermoplastic resin, which may be used as the binder of the peeling layer, there may be used without restriction any one of those known for the peeling layer of conventional thermal-transfer recording media of this kind, which include resins such as ethylene-vinyl acetate resins, polyamide resins, polyester resins, polyurethane resins, polyolefin resins, acryl resins, vinyl chloride resins, cellulose resins, rosin resins, petroleum resins and ionomer resins; elastomers such as natural rubber, styrene-butadiene rubber, isoprene rubber and chloroprene rubber; ester rubbers; rosin derivatives such as rosin-maleic acid resin, rosin-phenol resin and hydrogenated rosin; and other resins such as phenol resins, terpene resins, cyclopentadiene resins and aromatic resins. Preferred among these are the ethylene-vinyl acetate copolymer.

Preferably usable among these thermoplastic resins are those having a melting point of normally 50° to 150° C., particularly 60° to 120° C.

These thermoplastic resins may be used alone or in combination.

The thermoplastic resin is used in a proportion of normally not more than 50% by weight, preferably not more than 30% by weight of the whole composition of the peeling layer.

The foregoing cellulose resin, which may be used as a constituent of the peeling layer, is preferably ethyl cellulose, nitrocellulose, diacetyl cellulose or ethylhydroxy cellulose. Of these, the ethyl cellulose is particularly useful.

Preferably usable among these cellulose resins are those whose ethanol/toluene (ratio by volume of 20/80) solution containing 5% by weight solid matter has a viscosity at 25° C. of not more than 100 cps, particularly not more than 50 cps.

These cellulose resins may be used alone or in combination.

The cellulose resin is used in a proportion of normally not more than 50% by weight, preferably not more than 30% by weight and more preferably 1 to 20% by weight of the whole constituents of the peeling layer.

As the aforementioned additional heat-meltable substance, which may as needed be additionally incorporated into the peeling layer of the thermal-transfer recording medium of the invention, there may be used those commonly used as a constituent of the peeling layer of conventionally known thermal-transfer recording media, but the most preferred among them are solid or semi-solid ones whose melting point measured with a Yanagimoto MJP-2 instrument is from 40° to 150° C., preferably 50° to 120° C.

Examples of the heat-meltable substance include plant waxes such as carnauba wax, Japan wax, ouricury wax and esparto wax; animal waxes such as beeswax, insect wax, shellac wax and spermaceti; petroleum waxes such as paraffin wax, general microcrystaline waxes, polyethylene wax, ester wax and acid wax: and mineral waxes such as montan wax, ozokerite and ceresin. Besides, there may also be used higher fatty acids such as palmitic acid, stearic acid, margaric acid and behenic acid; higher alcohols such as palmityl alcohol, stearyl alcohol, behenyl alcohol, margaryl alcohol, myricyl alcohol and eicosanol; higher fatty acid esters such as cetyl palmitate, myricyl palmitate, cetyl stearate and myricyl stearate; amides such as actamide, propionic acid amide, palmitic acid amide, stearic acid amide and amide wax; and higher amides such as stearyl amine, behenyl amine and palmityl amine. These may be used alone or in combination.

The preferred among the above waxes is paraffin wax whose melting point measured in the above method is 50° to 100° C.

By using an optimal amount of the above additional heat-meltable material in combination with Microcrystaline wax (I) as the principal constituent of the peeling layer, the melting point and viscosity of Microcrystaline wax (I) can be lowered or adjusted to an appropriate range, whereby the intrinsic melting point range of Microcrystaline wax (I) can be varied wider to be suitably used.

An appropriate amount of the above additional heat-meltable material used is normally not more than 50 parts by weight and preferably not more than 40 parts by weight to 100 parts by weight of the total amount of the material and the Microcrystaline wax (I). If the using amount of the above additional heat-meltable material is too large, exceeding the above range, it causes Microcrystaline wax (I) to lose its intrinsic characteristics, thus making it impossible to sufficiently attain the object of the invention. For example, if an additional low-melting heat-meltable substance such as a low-melting paraffin wax is used in an amount larger than its optimal amount, it causes the peeling layer to have a larger peeling ability than is necessary or results in the deterioration of the letter print quality, while if an additional relatively high-melting heat-meltable substance such as a high-melting paraffin wax or polyethylene wax is used in an amount larger than its optimal amount, it causes the peeling ability deterioration in a high-speed printing, thus making it impossible to provide a sufficient transfer sensitivity.

The peeling layer may contain a coloring agent as previously mentioned. The coloring agent content of the peeling layer is normally not more than 30% by weight, preferably not more than 20% by weight of the whole composition of the peeling layer.

Usable as the above coloring agent are those commonly used, which include inorganic pigments, organic pigments and organic dyes. Examples of these pigments and dyes will be described hereinafter.

The kind and composition of the coloring agent contained in the peeling layer may be either the same as or different from that of the heat-meltable ink layer, which will be mentioned hereinafter.

The peeling layer may also contain a surface active agent for adjusting the peeling degree.

The surface active agent used in the invention is, e.g., a polyoxyethylene chain-containing compound.

The peeling layer, according to uses of the thermal-transfer recording medium of the invention, may also contain organic or inorganic fine particles such as metallic powder, silica gel, kaolin, bentonite and talc, or oils such as linseed oil and mineral oils in addition to the above constituents.

The peeling layer may be coated on a given support by using any one of conventionally known coating methods such as the aqueous coating method, coating method with use of an organic solvent and hot-melt coating method.

The thickness of the peeling layer is normally 0.2to 4 μm, and preferably 0.5 to 2 μm.

The peeling layer is required to be in the form of at least one layer. In the invention, the peeling layer may be in the form of two or more sublayers different in the kind of the Microcrystaline wax (I) and in the combination thereof with other additional constituents.

The peeling layer plays chiefly the role of adjusting the adhesion power of the heat-meltable ink layer to the support; it is a layer for facilitating the peeling of the ink layer from the support, e.g., by heating the back (non-peeling layer side) of the support by means of a heat-transfer mechanism such as a thermal head.

Namely, the peeling layer serves to retain the heat-meltable ink layer's physical characteristics such as its adhesion to the support and its mechanical strength, and enables quick peeling and transfer of the heat-meltable ink layer by the above heating at the time of use from the support onto a copying paper.

This peeling depends upon the post heating timing, peeling angle, applied energy, and printing conditions such as platen pressure, and includes an interfacial peeling that occurs at the interface between the support and the peeling layer adjacent thereto, an aggregation breaking peeling that occurs inside the peeling layer, and an interfacial peeling that occurs at the interface between the peeling layer and the thermally softening layer adjacent thereto.

Heat-meltable ink layer

The heat-meltable ink layer of the invention comprises a heat meltable compound a thermoplastic resin and a coloring agent.

Usable as the heat-meltable compound for the heat-meltable ink layer are those commonly used in the heat-meltable ink layer of conventional thermal-transfer recording media of this type, and examples of the compound include low-molecular thermoplastic resins such as polystyrene resin, acryl resin, styreneacryl resin, polyester resin and polyurethane resin; plant waxes such as carnauba wax, Japan wax, candelilla wax, rice wax, ouricury wax and esparto wax; animal waxes such as beeswax, insect wax, shellac wax and spermaceti; petroleum waxes such as paraffin wax, microcrystaline waxes including the Microcrystaline wax (I), polyethylene wax, Fischer-Tropsch wax, ester wax and oxidated wax; mineral waxes such as montan wax, ozokerite and ceresin wax: rosin derivatives such as rosin, hydrogenated rosin, polymerized rosin, rosin-modified glycerol, rosin-modified maleic acid resin, rosin-modified polyester resin, rosin-modified phenol resin and ester gum; and phenol resins, terpene resins, ketone resins, cyclopentadiene resins and aromatic hydrocarbon resins.

These heat-meltable compounds have a molecular weight of normally not more than 10,000, particularly not more than 5,000 and a melting point or softening point of preferably 50° to 150° C.

These heat-meltable compounds may be used alone or in combination.

Usable as the thermoplastic resin, one of the constituents of the heat-meltable ink layer, are those used in the heat-meltable ink layer of conventional thermal-transfer recording media. Examples of the resin include ethylene copolymers, polyamide resins, polyester resins, polyurethane resins, polyolefin resins, acryl resins and cellulose resins. Among these resins, the ethylene copolymer is suitably used.

Examples of the ethylene copolymer include ethylene-vinyl acetate copolymer, ethylene-ethyl acrylate resin, ethylene-vinyl acetate maleic anhydride resin, ethylene acrylic acid resin, ethylene methacrylic acid resin and ethylene-α-olefin copolymer. The preferred among these ethylene copolymers are ethylene-vinyl acetate copolymers such as ethylene-vinyl acetate copolymer, ethylene-ethyl acrylate resin and ethylene ethyl acrylate-maleic anhydride resin, or ethylene-vinyl acetate copolymer and ethylene-ethyl acrylate resin or ethylene-ethyl acrylate resin.

The non-ethylene comonomer unit content of these ethylene copolymers is preferably not less than 35% by weight. It is preferably less than 70% by weight.

By using the above specific composition comprising the ethylene-vinyl acetate copolymer and/or ethylene-ethyl acrylate resin as the thermoplastic resin or principal constituent of the heat-meltable ink layer, still better improvement of the adhesion property of the ink layer even to a low surface smoothness-having copying paper can be accomplished to thereby realize a high fixability of the printed image quality.

The above thermoplastic resin used as a constituent of the heat-meltable ink layer has a melt index (MI value) of normally 2 to 1,500, and preferably 20 to 500. It is apparent that the use of a thermoplastic resin having a MI value in the above range enables to sufficiently increase the adhesion power of the heat-meltable ink layer.

The aforementioned thermoplastic resins may be used alone or in combination.

In the invention, when the heat-meltable ink layer should be coated by an aqueous coating process, the thermoplastic resin may be used in the form of an aqueous emulsion. An aqueous emulsion of the thermoplastic resin is commercially available.

Usable as the foregoing coloring agent used as a constituent of the heat-meltable ink layer are those commonly used in the heat-meltable ink layer of conventional thermal-transfer recording media, which include inorganic pigments, organic pigments and organic dyes.

Examples of the above inorganic pigment include titanium oxide, carbon black, zinc oxide, prussian blue, cadmium sulfide, iron oxide and chromates of zinc, of barium and of calcium.

Examples of the above organic pigment include azo pigments, thioindigo pigments, anthraquinone pigments, anthoanthraquinone pigments, triphendioxazine pigments, vat dye pigments, phthalocyanine pigments such as copper phthalocyanine and derivatives thereof, and quinacridone pigments.

Examples of the above organic dye include acid dyes, direct dyes, disperse dyes, oil-soluble dyes, metal-containing and oil-soluble dyes.

These coloring agents may be used alone or in combination.

The foregoing heat-meltable compound constituent of the heat-meltable ink layer accounts for normally 20 to 80% by weight and preferably 30 to 70% by weight of the whole composition of the ink layer. If the heat-meltable compound content is too small, it may sometimes impair the legibility of minute letters recorded, while if the content is too large, it may cause a background stain.

The foregoing thermoplastic resin accounts for normally 5 to 40% by weight and preferably 10 to 30% by weight of the whole composition of the heat-meltable ink layer. If the thermoplastic resin content is too small, it may cause the recording medium to be unable to clearly record letters on a rough surface of paper, while if the proportion is too large, it may cause blocking trouble at a high temperature.

The foregoing coloring agent accounts for normally 5 to 30% by weight and preferably 10 to 25% by weight of the whole composition of the heat-meltable ink layer. If the coloring agent content is too small, it may cause a density-reduced or broken image, leading to a failure in accomplishing the object of the invention, while if the content is too large, it may result in an insufficient fixation of the image transferred from the ink layer.

The above heat-meltable ink layer may, if necessary, contain additives besides the aforementioned constituents as long as they do not impair the object of the invention. For example, the ink layer may contain a fluorosurfactant for improving the antiblocking property of the ink layer.

The thickness of the heat-meltable ink layer is normally 0.6 to 5.0 μm and preferably 1.0 to 4.0 μm.

The heat-meltable ink layer may be formed by coating a dispersion or solution of its constituents dissolved in an organic solvent (organic solvent method) or by coating a thermoplastic resin softened or molten by heating (hot-melt method), but in the invention, it is preferable that the layer be formed by coating an emulsion or solution of its constituents dispersed or dissolved in water or an organic solvent.

The layer forming constituents' content in total of the coating liquid for use in coating the heat-meltable ink layer is normally 5 to 50% by weight.

Examples of the method for coating the above constituents include wire-bar coating method, squeeze-coating method and gravure-coating method.

The heat-meltable ink layer needs to be at least one layer, but may be comprised of two or more sublayers different in the kind and content of the coloring agent or in the thermoplastic resin/heat-meltable compound ratio by weight.

Others

In the thermal-transfer recording medium of the invention, there may, if necessary, be provided an anchor layer between the support and the peeling layer or an intermediate layer between the peeling layer and the heat-meltable ink layer, and also a protective overcoat layer on the heat-meltable ink layer.

As the above overcoat layer there ma be suitably used. e.g., a coloring agent-free wax or polymer layer.

After coating the respective layers, the coated recording medium is dried and subjected to a surface smoothening treatment, and then slit or cut into a desired form, whereby a thermal-transfer recording medium of the invention is produced.

The thus obtained thermal-transfer recording medium may be used in the tape form or typewriter ribbon form.

The thermal transfer method which uses the thermal-transfer recording medium of the invention does not differ from conventional thermal-transfer recording methods, but it will be described, taking the case where a thermal head is used as a typical heat source.

The heat-softening layer such as the peeling layer and heat-meltable ink layer of the thermal-transfer recording medium of the invention is brought into contact with a recording paper, and, as needed, onto the back of the paper, while being given a thermal pulse by a platen, is applied a thermal pulse by means of a thermal head, whereby the heat-softening layer is locally heated corresponding to the desired recording pattern.

The heated pattern area of the heat-softening layer is quickly softened by its increasing temperature and then transferred onto a recording paper.

In this instance, the peeling layer, because of containing a heat-meltable material such as at least the foregoing Microcrystaline wax (I), is quickly peeled from the support even in a high-speed printing, and the heat-meltable ink layer, because of containing the foregoing thermoplastic resin, exhibits a high adhesion power even to a poor surface smoothness-having recording paper, thus forming a well-fixed high-quality recorded pattern image on the paper.

Particularly, the thermal-transfer recording medium of the invention has a specific excellent characteristic-having peeling layer which, since it is comprised principally of the specific-characteristics-having Microcrystaline wax (I), has an excellent peeling characteristic and can sufficiently protect the medium from the disadvantage that often occurs in conventional low-melting waxes, such as the deterioration of recorded image quality attributable to the constituents transition to the heat-meltable ink layer. Therefore, by at least the specific excellent peeling layer's action and function, the thermal-transfer recording medium of the invention can be realized as a practically advantageous one having an excellent resolution and being capable of providing a high-quality image with low transfer energy even in a high-speed recording on a poor surface smoothness-having recording paper.

EXAMPLES

Example 1

A liquid prepared by dispersing the following composition with a ball mill into toluene so as to have a solid concentration of 20% was coated to form a peeling layer having a dry thickness of 2.0 μm on a 3.5 μm-thick polyethylene terephthalate film. The coating was carried out by use of a wire bar.

Composition for peeling layer

| | |
|---|---|
| Microcrystaline wax (I) (Nisseki Microcrystaline Wax 180, produced by Nippon Oil Co., Ltd., melting point: 81° C.) | 95 wt % |
| Ethylene-vinyl acetate copolymer (72/28) | 5 Wt % |

Subsequently, a liquid prepared by dissolving the following composition in an organic solvent (MEK) was coated to form a heat-meltable ink layer having a dry thickness of 1.5 μm on the above peeling layer, whereby a thermal-transfer recording medium sample of the invention was prepared.

Composition for heat-meltable ink layer

| | |
|---|---|
| Carbon black | 20 wt % |
| Ethylene-vinyl acetate copolymer (40/60) | 20 wt % |
| Paraffin wax (melting point: 75° C.) | 20 wt % |
| Rosin-modified glycerol ester resin (softening point: 90° C.) | 40 wt % |

The obtained thermal-transfer recording medium sample was loaded in a commercially available high-speed printer provided with a 48-dot serial head to transfer alphabetical and other character patterns onto PPC paper having a Bekk smoothness of 30 seconds to thereby evaluate the resolution, transfer sensitivity and preservability of the transferred image on the rough surface of the paper in a high-speed printing under a platen pressure of 350 g/head. The results are shown in Table 1.

The respective characteristics were evaluated according to the following criteria:

Resolution (reproducibility of checkered pattern)

A—Excellent
B—Good
C—Poor
D—Bad

Transfer sensitivity

A—Sufficiently good
B—Good
C—Slightly insufficient
D—Insufficient

Preservability (by comparison with fresh sample)

A—The same
B—Almost the same
C—Slightly deteriorated
D—Deteriorated

EXAMPLE 2

A sample was prepared and evaluated in the same way as in Example 1 except that the ethylene-vinyl acetate copolymer (monomer ratio of 60/40) in the composition of the heat-meltable ink layer in Example I was replaced by an ethylene-vinyl acetate copolymer (monomer ratio of 72/28).

The results are shown in Table 1.

EXAMPLE 3

A sample was prepared and evaluated in the same manner as in Example 1 except that the composition of the peeling layer in Example 1 was replaced by the following composition for peeling layer and the composition of the heat-meltable ink layer in Example 1 was replaced by the following composition for heat-meltable ink layer.

The results are shown in Table 1.

Composition for peeling layer

| | |
|---|---|
| Microcrystaline wax (I) (Hi-Mic-1080, produced by Nippon Seiro Co.) | 90 wt % |
| Ethyl cellulose (viscosity: 10 cps) | 10 wt % |

Composition for heat-meltable ink layer

| | |
|---|---|
| Carbon black | 20 wt % |
| Ethylene-vinyl acetate copolymer (45/55) | 10 wt % |
| Low-molecular polyester resin (softening point: 90° C.) | 40 wt % |

EXAMPLE 4

A sample was prepared and evaluated in the same manner as in Example 1 except that the composition of the peeling layer in Example 1 was replaced by the following composition for peeling layer and the composition of the heat-meltable in layer in Example 1 was replaced by the following composition for heat-meltable ink layer.

The results are shown in Table 1.

Composition for peeling layer

| | |
|---|---|
| Microcrystaline wax (I) (Hi-Mic-1080, produced by Nippon Seiro Co.) | 85 wt % |
| Ethylene-vinyl acetate copolymer (72/28) | 10 wt % |
| Ethyl cellulose (viscosity: 4 cps) | 5 wt % |

Composition for heat-meltable ink layer

| | |
|---|---|
| Carbon black | 20 wt % |
| Ethylene-vinyl acetate copolymer (60/40) | 25 wt % |
| Rosin-modified glycerol ester resin (softening point: 110° C.) | 25 wt % |
| Low-molecular polystyrene resin (softening point: 80° C.) | 30 wt % |

EXAMPLE 5

A sample was prepared and evaluated in the same manner as in Example 1 except that the composition of the peeling layer in Example 1 was replaced by the following composition for peeling layer and the composition of the heat-meltable ink layer in Example 1 was replaced by the following composition of heat-meltable ink layer.

The results are shown in Table 1.

Composition for peeling layer

| | |
|---|---|
| Microcrystaline wax (I) (Hi-Mic-1080, produced by Nippon Seiro Co.) | 75 wt % |

-continued

| | |
|---|---|
| Ethylene-vinyl acetate copolymer (72/28) | 5 wt % |
| Ethyl cellulose (viscosity 7 cps) | 5 wt % |
| Paraffin was (melting point: 75° C.) | 15 wt % |

Composition for heat-meltable ink layer

| | |
|---|---|
| Carbon black | 20 wt % |
| Ethylene-vinyl acetate copolymer (55/45) | 20 wt % |
| Microcrystaline wax | 30 wt % |
| Low-molecular polyester resin (softening point: 80° C.) | 30 wt % |

COMPARATIVE EXAMPLE 1

A sample was prepared and evaluated in the same manner as in Example 1 except that the Microcrystaline wax (I) contained in the peeling layer in Example 1 was replaced by a paraffin wax having a softening point of 75° C.

The results are shown in Table 1.

COMPARATIVE EXAMPLE 2

A sample was prepared and evaluated in the same manner as in Example 1 except that the Microcrystaline wax (I) contained in the peeling layer in Example 1 was replaced by a paraffin wax having a softening point of 65° C.

The results are shown in Table 1.

COMPARATIVE EXAMPLE 3

A sample was prepared and evaluated in the same manner as in Example 1 except that the Microcrystaline wax (I) contained in the peeling layer in Example 1 was replaced by a polystyrene wax having a softening point of 107° C.

The results are shown in Table 1.

TABLE 1

| | Characteristics of image printed on PPC (Bekk smoothness: 30 sec.) | | |
|---|---|---|---|
| | Resolution | Sensitivity | Preservability |
| Example 1 | A | A | B |
| Example 2 | B | B | B |
| Example 3 | A | A | A |
| Example 4 | A | A | A |
| Example 5 | A | B | A |
| Comparative example 1 | B | C | C |
| Comparative example 2 | B | B | D |
| Comparative example 3 | B | D | B |

As is apparent from Table 1, the thermal-transfer recording medium of the invention, even when used in a high-speed printing with low energy onto a poor surface smoothness-having PPC paper, shows a high transfer sensitivity and produces a well-transferred image having a high resolution and excellent preservability.

What is claimed is;

1. A thermal-transfer recording medium comprises a support having thereon a peeling layer comprising principally a microcrystaline wax whose penetration number at 25° C. is not more than 20, and a heat-meltable ink layer.

2. A thermal-transfer recording medium of claim 1 wherein the melting point of the microcrystaline wax is 50° to 120° C.

3. A thermal-transfer recording medium of claim 1 wherein the peeling layer comprises a cellulose resin.

4. A thermal-transfer recording medium of claim 1 wherein the microcrystaline wax content of the peeling layer is more than 50% by weight.

5. A thermal-transfer recording medium of claim 4, wherein the microcrystaline wax content of the peeling layer is 60 to 95% by weight.

6. A thermal-transfer recording medium of claim 1 wherein thickness of the peeling layer is 0.5 to 4 μm.

7. A thermal-transfer recording medium of claim 1 wherein the heat-meltable ink layer comprises a heat meltable compound, a thermoplastic resin and a coloring agent.

8. A thermal-transfer recording medium of claim 7 wherein a molecular weight of the thermoplastic resin is not more than 10,000.

9. A thermal-transfer recording medium of claim 7 wherein a softening point of the thermoplastic resin is 50° to 150° C.

10. A thermal-transfer recording medium of claim 9 wherein a thickness of the heat-meltable ink layer is 0.6 to 5.0 μm.

11. A thermal-transfer recording medium comprises a support having thereon a heat-meltable ink layer having a thickness of 0.5 to 2.5 μm and comprising a heat meltable compound, a thermoplastic resin and a coloring agent, and a peeling layer comprising principally of a microcrystaline wax whose penetration number at 25° C. is not more than 20,.and having a thickness of 0.5 to 2 μm.

* * * * *